J. B. BARTHOLOMEW.
GANG PLOW.
APPLICATION FILED NOV. 29, 1910.
1,160,685.
Patented Nov. 16, 1915.
2 SHEETS—SHEET 2.
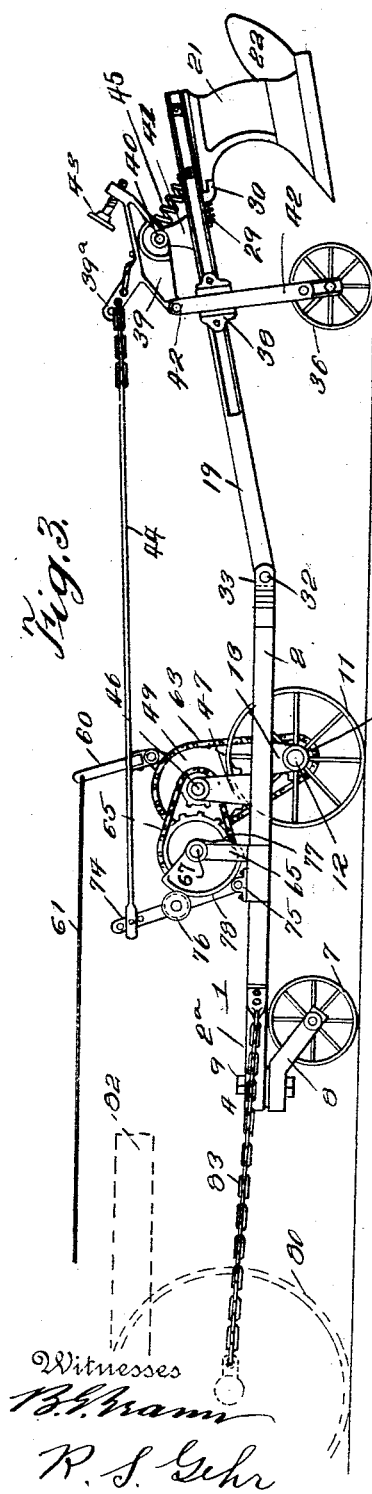
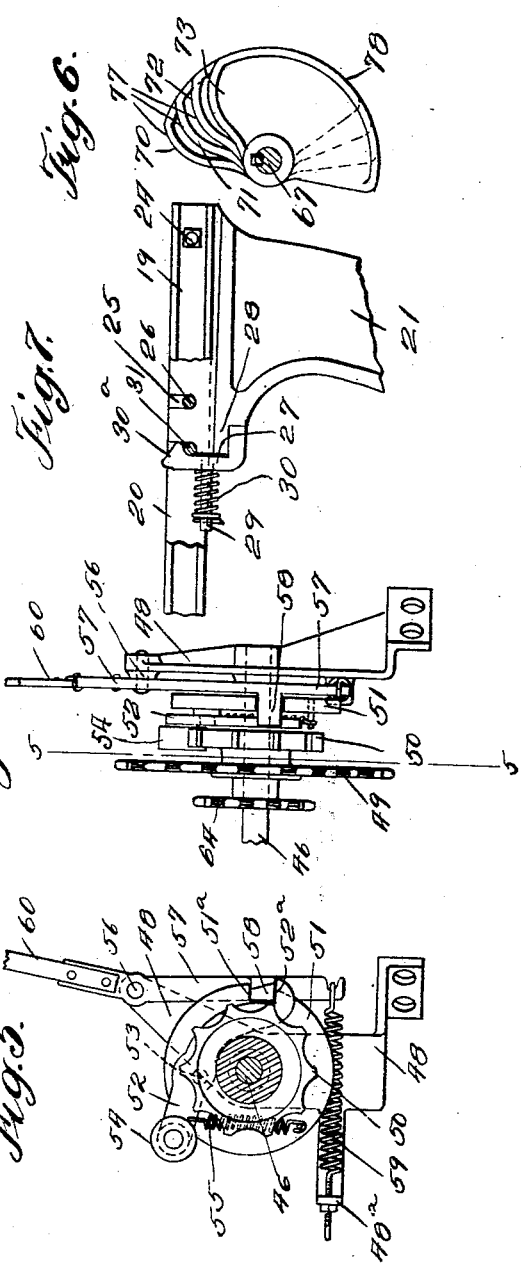
Witnesses
Inventor
John B. Bartholomew
H. H. Bliss
Attorney

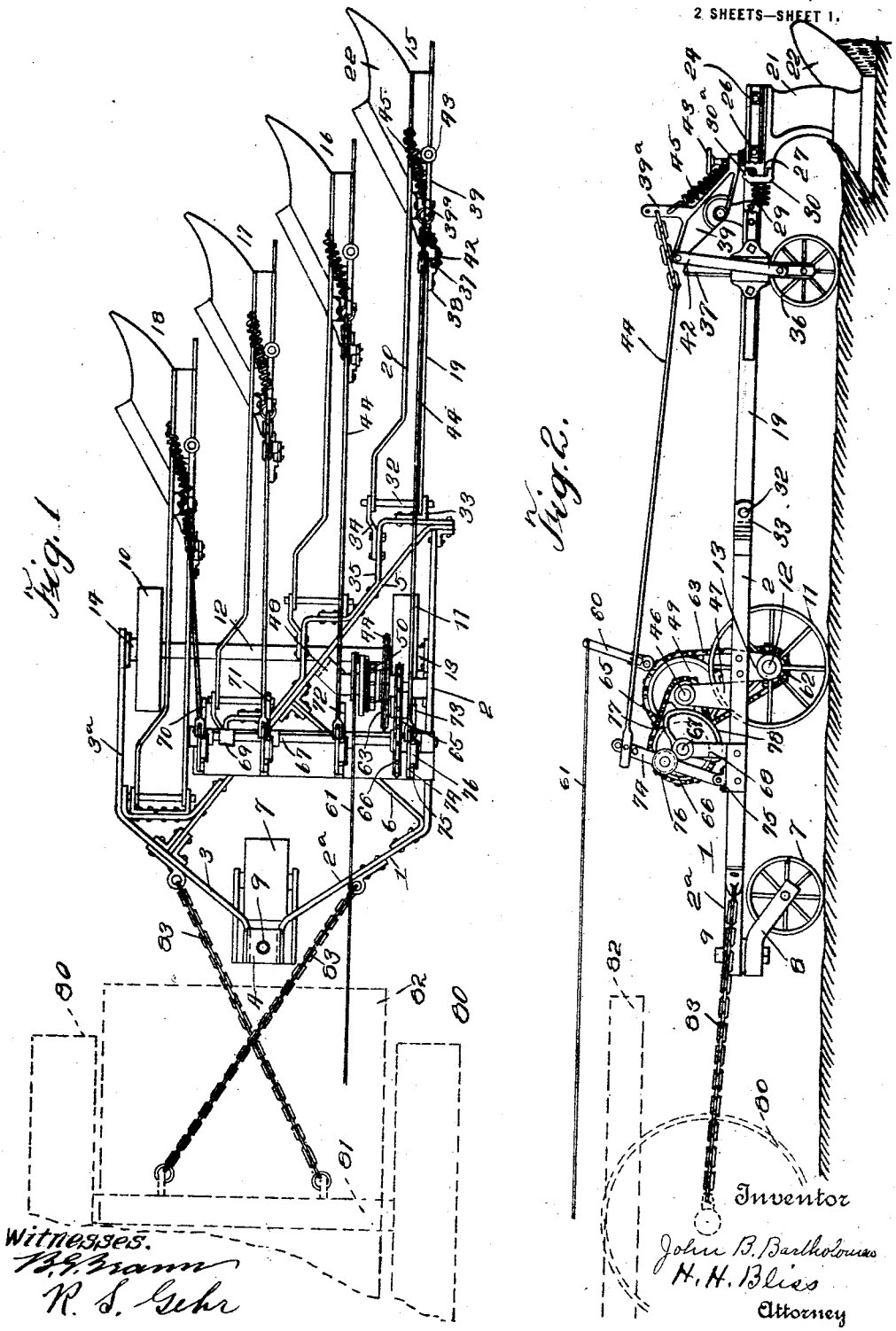

UNITED STATES PATENT OFFICE.

JOHN B. BARTHOLOMEW, OF PEORIA, ILLINOIS, ASSIGNOR TO AVERY COMPANY, A CORPORATION OF ILLINOIS.

GANG-PLOW.

1,160,685.  Specification of Letters Patent.  Patented Nov. 16, 1915.

Application filed November 29, 1910. Serial No. 594,727.

*To all whom it may concern:*

Be it known that I, JOHN B. BARTHOLOMEW, a citizen of the United States, residing at Peoria, in the county of Peoria and State of Illinois, have invented certain new and useful Improvements in Gang-Plows, of which the following is a specification, reference being had therein to the accompanying drawing.

This invention relates to gang plows and particularly to power actuated devices for lifting the plows from the ground. In machines of this character, the individual plows of the gang are of necessity arranged in a line oblique to the lines of draft or general direction of travel. For this reason when devices are used which raise or lower the plows simultaneously the end of the furrows are left uneven. To obviate this devices have been proposed for effecting the lifting of the plows in succession and also their similar lowering so as to secure furrows of equal length.

One object of my present invention is to produce a gang plow provided with power lifting devices of this latter character which are simple in construction and reliable and efficient in operation.

The invention relates particularly to gang plowing mechanisms of the class in which each comprises an engine or tractor and a draft frame detachably connected to it and trailing behind it, this frame being so mounted and supported in relation to the ground surface that the plow-beam-attaching points will be held in substantially fixed positions in relation to the ground surface when the apparatus is at work. Each plow unit is secured to the draft frame in such way that the important parts of the unit, such as the body and the beam, will be so held at all times that they can vibrate vertically in arcs which are fixed in relation to the connecting points on the frame. The plowing mechanisms of the class referred to are in contradistinction to those of the class in which there were several points of flexible union between the beam and the frame; there always being an overhanging support connected to the unit at a point near the plow body, and intended to lift or lower the body, and there generally being also a link system interposed between the front end of the beam proper and the draft frame, the link or links being connected to the front end of the beams by one set of pivot devices, and the front end of the link or links being connected by another set of pivot devices, the front end of the beam proper being allowed to move vertically bodily in relation to the frame and sometimes to move laterally.

In a plow of the sort to which the present invention relates, the plow unit comprises a beam which, when at work, is rigid in relation to the plow body, and is secured to the draft frame by a device furnishing a single pivot abutment around which the beam and the body swing vertically, as aforesaid, in fixed arcs, and the supporting of the body at any one of its several working lines (optionally predetermined) and its lifting vertically to points above the ground are accomplished by means of a wheel connected to the beam and located relatively near the body whereby it is adapted to take the down pressure from the suction of the body when at work and from its gravity when it is elevated for transportation.

Another object of the invention is to provide, in a plowing mechanism of the class described, power mechanism (preferably operated by ground wheels as, for instance, those which support the main frame) connected to the ground wheels which support the plow units to move them relatively at uniform intervals and at uniform speeds successively beginning with the foremost one to effect the lifting of the several plow units at uniform intervals and at uniform speeds successively beginning with the foremost one.

The form of my invention which I prefer as now advised is shown in the accompanying drawings in which, Figure 1 is a plan view of a gang plow and the rear end of a tractor to which the plow is connected by draft devices; Fig. 2 is a left side elevation of the same with the exception that only one of the individual plows is shown, the others being omitted to avoid confusion; Fig. 3 is a view similar to Fig. 2, but with the plow raised from the ground; Fig. 4 is a rear elevation of the clutch mechanism which constitutes a part of the power lifting device; Fig. 5 is a vertical section on the line 5—5 of Fig. 4; Fig. 6 is a diagrammatic side view of the lifting cams showing their spaced relation to each other; Fig. 7 is a detail view of the upper part of the shank of one of the individual plows.

Referring in detail to the construction illustrated, 1 designates the main frame of the plow as an entirety. This frame is roughly triangular in outline and consists of a side bar 2 having an oblique forward extension 2ª, an obliquely disposed bar 3 which is connected by a block 4 with the oblique bar 2ª, and an obliquely disposed bar 5 extending from the rear end of the side bar 2 forward to the oblique bar 3. A brace bar 6 extends from the left forward corner of the frame to the oblique bar 5. All of the frame bars are rigidly connected as by rivets or bolts.

The frame is supported on the ground by wheels, there being a front wheel 7 mounted on a swinging yoke or carrier 8, said carrier having at its front end a vertical trunnion 9 mounted in the block 4 of the frame. In addition there are wheels 10 and 11 mounted upon a transverse axle 12 which is mounted at one end in a bearing bracket 13 on the frame bar 2 and at its other end in a bearing bracket 14 which is carried by a rearward extension 3ª of the frame bar 3.

In the present construction I have shown a gang made up of four individual plows or plowing units 15, 16, 17 and 18. Each of these units preferably consists of a beam or frame made up of parallel bars 19, 20, between which are bolted the shank or standard 21 which carries the plow body 22. The upper part of the plow shank 21 is preferably formed as shown in Fig. 7, there being a hole through which is passed one of the securing bolts 24, a slot 25 through which the other securing bolt 26 passes.

27 is a spring clip which has a sliding engagement with a shoulder 28 formed on the front of the plow shank and which is held in position by a stud bolt 29 and a coiled spring 30 interposed between the head of said bolt and the clip. The upper end of the clip is formed with a hook 30ª which overlies a cross bolt 31 carried by the plow beam bars 19, 20. The spring pressed clip serves to hold the plow body in its normal upright position when the resistance to the advance of the plow is normal, but when an obstruction such as a rock or the like is struck the abnormal resistance causes the spring clip to give way and permits the plow body to swing downward and rearward about the securing bolt 24.

I do not herein specifically claim the connection shown between the plow-beam and the plow-shank or standard as it is presented and claimed in my co-pending application Ser. No. 670,228, filed Jan. 9, 1912.

The front ends of the beam bars 19 and 20 are preferably spaced apart as shown in Fig. 1, and pivotally secured to a rod or pin 32 which is carried by brackets 33, 34, which in turn are secured to a bar 35 which is bent as shown to form offsets to receive said brackets. The individual plow thus connected to the main frame is free to swing vertically but is held against swinging laterally and against tipping or winging.

Each plow unit is provided with a supporting and lifting wheel 36 which is vertically movable with respect to the unit. In order to permit vertical movement or adjustment each wheel is mounted upon a standard 37 which is arranged to slide vertically in bracket 38 carried by the beam bar 19. Suitable devices are provided on the beam and connected with the wheel for moving the wheel relatively to the beam and thereby lifting unit as a whole upon the wheel as a support. Of the mechanism shown, 39 is a bell crank or lever fulcrumed at 40 on a bracket 41 and connected at its forward end by a link 42 to the standard 37. A hand screw 43 is mounted in the rear end of the lever 39 so as bear upon one of the beam bars of the plow. The lever 39 carries an upright extension 39ª to which is adjustably connected a link 44 that extends forward to actuating devices which are presently to be described.

45 is a coil spring which is secured at one end to the lever extension 39ª and at its other end to one of the plow beam portions. When the front end of the lever 39 is raised throwing the wheel 36 to its uppermost position, which position is determined by the contact of the screw 43 with the plow beam, said wheel serves as a supporting wheel. By throwing the front end of the lever 39 downward it will be seen that the wheel 39 is forced downward relative to the plow beam, or to speak more accurately, the plow beam is raised relatively to the wheel and as the wheel rests upon the ground the plow body is thus lifted from the soil.

Each of the individual plows is constructed and arranged as has been described and to provide for the lifting of the plows in succession I provide a suitable power mechanism, which, in the preferred form, is actuated by ground wheel traction. The mechanism which I have shown and which I prefer is connected to transmit the power of the main frame ground wheels to the lever 39; but it will be understood that as concerns this feature of my invention there can be variation.

As shown, a short shaft 46 is mounted preferably transversely in bearing brackets or standards 47 and 48, these brackets being carried by the frame bars 2 and 5 respectively. On this shaft 46 is mounted a clutch mechanism which comprises parts as follows.

49 is a sprocket wheel which is rigid with a serrated wheel 50, the two turning loosely on the shaft 46. Adjacent the wheel 50 is a disk 51 which is keyed to the shaft 46, and 52 is a pawl or dog which is pivoted at 53 to the disk 51. This dog carries at one end a roller 54 which is adapted to be swung into engagement with the teeth of the serrated wheel 50. On the other end of the dog 52 is formed a shoulder 52a having a function which will presently be stated.

55 is a spring interposed between an abutment on the disk 51 and the dog 52, said spring tending to swing the roller 54 into engagement with the teeth of the wheel 50.

The bearing standard 48 carries a pivot pin 56 upon which is mounted a lever 57, the said lever being thus disposed adjacent the disk 51. The lower end of the lever carries a laterally extending lug 58 which extends across the plane of the disk 51 into the plane of the dog 52. The lower end of the lever 57 is notched to receive the end of a spring 59, the other end of which is adjustably secured to a lug 48a on the standard 48. The spring 59 draws the lower arm of the lever 57 toward the shaft 46 and presses the lug 58 against the periphery of the disk 51. Normally the lug 58 lies in a notch 51a formed in the disk 51. The lever 57 has an upward extension 60 to which is connected a cord 61 which can be extended forward to a point where it may conveniently be grasped by a person on the tractor.

On the axle 12 directly beneath the sprocket wheel 49 is secured a sprocket wheel 62 and this is connected by means of a sproket chain 63 to the wheel 49 so that the latter is constantly driven when the axle is turning. The parts are normally in the positions shown in Fig. 5, the lug 58 being in engagement with the dog 52 and serving to press said dog against the action of the spring 55 into the position shown so that the roller 54 is entirely out of engagement with the serrated wheel 50. If now the cord 61 is pulled forward the lower arm of the lever 57 is swung rearwardly so as to raise the lug 58 out of the notch 51a and out of engagement with the dog 52. The dog 52 when freed from the pressure of the lug 58 is swung by the spring 55 to bring the roller 54 into engagement with the serrated wheel 50. The rotation of the latter wheel is then transmitted through the dog 52 to the disk 51 thus causing said disk to turn with the shaft. The pull on the cord having been relieved after the engagement of the clutch, the lower end of lever 57 is again swung forward under the action of the spring 59 so that the lug 58 rides upon the edges of the disk 51 as the latter rotates. As the revolution of the disk 51 nears its end, the shoulder extension 52a of the dog 52 engages the lug 58 so that the dog begins to swing upon its pivot 53 and then as the notch 51a of the disk 51 comes opposite the lug 58 the latter is snapped forward, thus causing the dog to be swung to its initial position with the roller 58 entirely out of engagement with the serrated wheel 50. In this manner the movement of the disk 51 and therefore of the shaft 46 is stopped precisely at the end of a single revolution.

64 is a sprocket wheel keyed or otherwise rigidly secured to the shaft 46 and this wheel is connected by means of a sprocket chain 65 to a sprocket wheel 66 which is fast on a transverse shaft 67, this shaft being rotatably supported in bearing standards 68, 69. In the construction shown the diameter of the sprocket wheel 64 is one half that of the wheel 66 and it will be seen therefore that when the shaft 46 is given a single revolution by the action of the clutch mechanism which has been described, the shaft 67 will be given a half revolution.

On the shaft 67 is mounted a series of arms 70, 71, 72 and 73 preferably in the form of cams shaped as shown. The cams are disposed respectively approximately in line with the individual plows. Adjacent each cam is arranged a lever arm 74 which is pivoted at its lower end to a bracket 75 on the main frame. This lever is adjustably connected at its upper end to the front end of the link or rod 44 which at its other end is connected to the plow lifting lever 39. Each of the lever arms 74 carries a roller 76 in a position to bear upon the adjacent cam.

Each of the cams referred to is formed on its forward edge or side with an outwardly and rearwardly curving surface 77 which I shall refer to as the active surface. This surface merges with a neutral circular or cylindrical surface 78, and the rear edge of the cam is substantially radial. All of the cams are formed alike but they are spaced angularly from each other as shown in Fig. 6, the cam 70 which is associated with the forward plow 18 being farthest ahead. The spacing of the cams is determined by the distance one plow is in advance of another and by the diameter of the wheels 10, 11, and the ratios of the gears between the wheel axle 12 and the shaft 46, the spacing being such that the several cams come into action one after another so that the plows are lifted from the ground at points in the same transverse line. It will be seen that when the shaft 67 is rotated the active parts 77 of the cams press against the rollers 76 and causes the lever 74 to swing forward and thus the lifting levers 39 are swung so as to lift the individual plows on their respective gage wheels 36. As the rollers 76 one after another ride outward on the active faces 77 of their respective cams they pass upon the neutral cylindrical surfaces 78 of said cams and are thus automatically held forward so as to hold the plows in their elevated positions. In other words the actuating devices for the plow lifting means are non-overhauling, when said devices have been moved into their positions corresponding to the elevated positions of the plows. Furthermore, the length and relative angular arrangement of the cylindrical surfaces 78 of each of the cams is such that at the end of a half revolution of the shaft 67 the several rollers 76 rest upon intermediate points of the said cylindrical surfaces 78 of the respective cams with said surfaces extending a substantial distance on either side of the rollers 78; so there is no precise point or dead center at which the cam shaft must be stopped in order to secure the automatic locking action of the actuating devices.

To lower the plows it is only necessary to trip the clutch mechanism thus causing one revolution of the shaft 46 and a half revolution of the shaft 67. During this half revolution of the shaft 67 the neutral faces 78 of the cams are moved one after another, beginning with the cam 70, past their respective rollers 76, thus allowing one after another of the levers 74 to swing rearward under the action of the weight of the plows so that one after another of the plows are lowered and enter the ground at points on the same transverse line.

In the drawings I have indicated diagrammatically the rear end of a tractor having wheels 80, 80, mounted on an axle 81, and having a body or framework 82. The plow frame can be detachable and flexibly connected to the tractor in any suitable manner, but I prefer to employ crossed chains 83, 83, arranged as shown in Figs. 1 and 2.

The operation or handling of the plow will be readily understood from the description which I have given. Arriving at the end of the furrows the engineer or driver of the tractor has only to pull forward on the cord 61 so as to trip the clutch mechanism whereupon the cam shaft 67 is given a half revolution during which the cams are swung forward so as to lift the plows from the ground one after another in the manner described and to sustain them in their elevated positions. The machine having been turned the driver can again lower the plows one after the other by simply pulling on the cord 61 as before, thus again tripping the clutch mechanism and causing a second half revolution of the cam shaft 67 during which the plows are again lowered in succession. By adjusting the connections of the links 44 to the lever arms 74 and 39ª the height to which the plows are lifted can be varied within certain limits. And by adjusting the hand screw 43 the depth of the cut can be varied as has been explained.

I consider the improved cam mechanism for raising, holding and lowering the plows to be much simpler and more practical and reliable in operation than any other means which has been proposed for this purpose and with which I am familiar. In this connection it will be understood that my invention is not restricted to the particular form of cam shown nor to the particular way of mounting and moving the cams for it will be apparent that some at least of the advantages of my invention can be secured by cams formed, mounted and moved in other ways.

It will be seen that the mechanism which I provide embodies more than the mere conception, more or less vaguely entertained, of employing power devices for lifting the plows instead of manually operated devices. I provide means to prevent the movement of the plow body below a certain predetermined depth, that is, prevent its bottom working line from being more than a predetermined distance below the ground contacting line of the wheel 36 and yet permit the power devices, at any instant, to immediately press downward the wheel 36, or, in other words, to raise the plow body in relation to that wheel, it being understood that the vertical movements of these two parts, the wheel and the body, are relative, and therefore the wheel can be described as moving downward in relation to the body, or the body as moving upward in relation to the wheel. In manually actuated or hand-lever mechanisms, the wheel and the body require a lock supplemental to the hand lever proper, which lock will prevent relative movement of either the wheel in both directions or the body in both directions. In my construction there is a lock or stop acting in one direction only, that is to say, acting to prevent the body from descending below a predetermined line, or to prevent the wheel from relatively rising above a predetermined line, while the body is at the same time free to move in one direction and the wheels free to move in another direction, and because of this the power mechanism is free to automatically press the wheel downward or lift the body upward. And the final abutment or thrust point around which these relative movements take place is the abutment provided by the single fixed hinge uniting the beam to the draft frame.

The connecting devices between the lever 74 on the main frame and the lever 39 on the beam can be so connected as to provide some looseness. Such an adjustment is indicated in Figs. 2 and 3, where the link 44 is shown as being pivoted to the lever 74 at the intermediate pivot hole in the lever. This looseness is found sufficient on the one hand to permit the beam to move downward to some extent below its predetermined normal horizontal plane without causing such tension on the lever 39 as to press the wheel 36 down to any material extent, and on the other hand, the slack or looseness is not sufficiently great to prevent the power devices from practically immediately exerting tension through the transmitting train to effect an instant pick up of the beam and body on the wheel. A sufficient variation, as required by circumstances, can be insured in this respect by the provision made for varying the points of attachment of the draft train to the levers 74 and 39. By ascertaining the proper amount of lost motion and slackness in a draft train such as that herein shown and then attaching the united parts of the train at the proper points a sufficiently wide range in the vertical movements of the plow beams can be provided for, particularly where the land is approximately level throughout to avoid the lifting of the body out of the ground by pressure on the wheel, whether the beam descends to a limited extent from or lies above its normal plane.

There are a number of characteristics essential for the practical operation of a plow of the class to which my invention relates. As the plowing mechanism as a whole is moving steadily forward during the raising or lowering of the plowing units and as the units are all positioned in the same oblique line it is absolutely essential that both the raising and lowering of the plows be effected at uniform intervals of time and at uniform speeds.

As stated at the outset, one of the principal objects of the invention is to provide automatic means whereby the ends of the furrows can be made to terminate all in the same transverse line, and it will therefore be apparent that mere successiveness of lifting is not sufficient. The plows must be lifted one after another at uniform intervals of time, each of which must be the exact equivalent of the interval of time required for one plow to travel the longitudinal distance between it and the next. In order to secure not only the proper uniformity of intervals between the lifting of the different plows, but also to secure the proper relationship between the said intervals and the rate of travel it is preferable that the lifting mechanism be connected to and operable by means of one of the main frame ground wheels which of necessity rotates at a speed proportionate to the speed of travel. It is also essential that the lifting device for each plowing unit be connected with the power mechanism independently of the others so that no plowing unit or its lifting device can interfere with or in any way affect the operation of its neighbor to vary the speed of lifting or disturb the normal uniformly timed relationship. In plowing, the ground varies greatly from point to point and it frequently happens that when lifting is to take place one of the plow bodies is embedded in a dense heavy clay and that another is embedded in a loose sandy soil. Obviously the plow body in the sandy soil would be lifted more easily than the other and it is therefore clear that the lifting devices for each must be independent as the lifting of the second plow from the sand cannot be made dependent upon the prior lifting of the first plow from the clay. For a successful modern gang plow it is also essential that a self-contained unit be provided. These plows are hauled by tractors or traction engines which must at times be used for other purposes. They must therefore be readily detachable and all the mechanism necessary for plowing must be located on the plow itself and not on the traction engine or tractor. Furthermore the plow must be flexibly connected with the tractor so that it can closely follow the surface of the ground. For this reason also the plow unit lifting mechanism must be located fixedly with respect to the main frame in order that it may not be in any way affected by any relative movements between the main frame and the tractor. Not only must the main frame be flexibly connected to the tractor but the individual plowing units must be flexibly connected with the frame as concerns relative vertical movements. Each plowing unit must be free to follow the ground surface closely under the guidance and control of its own supporting wheel and without interference by the lifting devices. And yet these lifting devices must be so constructed and arranged as to be substantially instantly available when the time comes for their use.

It will be seen that by my invention I have provided an entirely self-contained plowing machine which is independent of the tractor except for haulage; which has a diagonal series of plowing units each firmly pivoted to the main frame and carried in fixed relation to the ground on its own individual supporting wheel; and which has a lifting mechanism, operable independently of the tractor, mounted on the frame and adapted to lift the normally free plowing units by means of their ground wheels in uniformly timed succession each independently of the others.

I do not herein specifically claim the features of novelty incident to a single plowing unit and its adjuncts, as these are made the subject of my co-pending application, Serial No. 707,255, filed July 2, 1912, as a division of this application.

What I claim is:—

1. The combination with a main plow frame and a series of individual plows connected thereto on a line oblique to the direction of travel, of means for successively raising the plows from the ground comprising a series of angularly spaced cams, plow lifting devices coöperating with said cams and means for actuating the cams, each of said cams being formed with an active part to effect the lifting of a plow and a neutral part to sustain the plow in elevated position.

2. The combination with a main plow frame and a series of individual plows connected thereto on a line oblique to the direction of travel, of means for successively raising the plows from the ground comprising a series of rotating angularly spaced cams each of which is formed with an active outwardly curved part and with a neutral circular part, a series of plow lifting devices arranged to coöperate with the active parts of the cams to effect the lifting of the plows and with the neutral parts of the cams to sustain the plows in elevated position and means for actuating the cams.

3. The combination with a main plow frame and a series of individual plows connected thereto on a line oblique to the direction of travel, of means for successively raising said plows from the ground comprising a series of angularly spaced actuating cams each of which is formed with an active outwardly extending part and with a neutral cylindrical part, a series of members movably mounted upon the main frame adjacent the cams, a roller on each of said members arranged to be operatively engaged by the adjacent actuating cam, and operative connections between each of the said members and one of the individual plows.

4. The combination with a main plow frame and a series of individual plows connected thereto on a line oblique to the direction of travel, of means for successively raising the plows from the ground comprising a series of individual plow lifting devices, a series of devices for successively actuating said lifting devices, power means for driving the said actuating devices, manual means for throwing said power means into operation, and automatic means for throwing the power means out of operation to stop the said actuating devices with the plows in elevated positions, said actuating devices when stopped by the said automatic means being non-overhauling, whereby the plows when raised are automatically sustained in their elevated positions.

5. The combination with a main plow frame and a series of individual plows connected thereto on a line oblique to the direction of travel, of means for successively raising the plows from the ground comprising a series of individual plow lifting devices and a series of devices for successively actuating said lifting devices, said actuating devices having a certain substantial range of movement corresponding to the elevated positions of the plows within which range said devices are non-overhauling, whereby the plows when raised are automatically sustained in their elevated positions.

6. The combination with a main plow frame and a series of individual plows connected thereto on a line oblique to the direction of travel, of means for successively raising and lowering the plows comprising a cam shaft mounted on the main frame, a series of cams mounted on said shaft, a series of plow lifting devices coöperating with the cams respectively, said cams being angularly spaced in relation to each other and each cam having an active part to effect the lifting of the plow and a neutral part to sustain the plow in raised position, a power shaft on the main frame, and driving connections between the cam shaft and said power shaft including a clutch adapted when manually tripped to effect a partial rotation of the cam shaft.

7. The combination with a main plow frame and a series of individual plows connected thereto on a line oblique to the direction of travel, of means for raising the plows from the ground comprising a cam shaft mounted on the main frame, a series of cams mounted on said shaft in spaced angular relation to each other, a series of swinging levers mounted on the frame adjacent the respective cams, each of the cams being arranged to coöperate with one of the swinging levers and adapted when the cam shaft is given a partial rotation to move the lever and hold it against return and when given a subsequent additional partial rotation to permit the return of the said lever, connections between each lever and one of the individual plows, and manually controlled power devices for intermittently turning the cam shaft.

8. The combination with a main plow frame and a series of individual plows connected thereto on a line oblique to the direction of travel, of means for successively raising and lowering the plows comprising a cam shaft mounted on the main frame, a series of cams mounted on said shaft, a series of plow lifting devices coöperating with the cams respectively, said cams being angularly spaced in relation to each other and each cam having an active part to effect the lifting of the plow and a neutral part to sustain the plow in raised position, a power shaft on the main frame, and driving connections between the cams and said power shaft.

9. Power operative means for lifting the plows of a gang successively, comprising levers connected with the different individual plows, a cam shaft and a series of cams thereon continuously contacting with said levers respectively, each of said cams having a continuous surface comprising an active lifting portion, a plow sustaining high portion and an intervening low portion, and means to operate the cam shaft.

10. In a traction plow, having a tractor and a series of plows, a series of levers pivotally mounted on the tractor and connected with said plows, a series of angularly spaced cams each having a continuous surface comprising a high portion and a low portion coöperating with one of the said levers to oscillate the same and lift or lower the corresponding plow, said high portions and low portions of the cams being shaped and positioned so that a discontinued half revolution of the cam will operate to cause the high portion thereof to lift the plows and hold the same in lifted positions, while a further half revolution of the cams in the same direction will permit the levers to coöperate with the low portions thereof so that the plows will be lowered, and means to intermittently effect discontinued half revolutions of said cams.

11. In a traction plow having a tractor and a gang of plows, a series of levers pivotally mounted on the tractor and connected with correspondingly positioned plows, a shaft having a series of cams coöperating with said levers to oscillate the same to lift or lower the plows, each of said cams having a continuous surface comprising a high portion to lift a plow and hold the same in lifted position and a low portion to coöperate with said lever to permit the plow to be lowered, said high and low portions being differentially positioned on said shaft so that a discontinued half revolution of the shaft will cause the high portions successively to lift and hold lifted all of the plows of the series, while a further half revolution of said shaft will successively bring the low portions of said cams into coöperation with said levers to permit all of the plows of the series to be lowered successively, and means intermittently effect discontinued half revolutions of said shaft.

12. Power operative means for lifting the plows of a gang successively, comprising lifting members connected with the different individual plows, a cam shaft and series of angularly spaced cams thereon continuously contacting with said members, each of said cams having a continuous surface comprising an active lifting portion, a plow sustaining high portion, a plow dropping portion and a low portion between the lifting and plow dropping portions, and means to operate the cam shaft.

13. The combination of a draft frame detachably and flexibly connectible with a tractor, ground wheels upon which the frame is entirely supported, trailing plowing units having at their front ends vertically fixed transverse horizontal pivotal connections with the frame, vertically adjustable ground wheels normally carrying the units respectively in fixed relation to the ground, and mutually independent uniformly speeded power transmitting trains connecting the draft frame ground wheels with the several adjustable ground wheels respectively and acting in uniform succession to move the latter with respect to their units, thereby successively lifting the said units at uniform intervals definitely related to the speed of travel.

14. The combination of a draft frame detachably and flexibly connectible to a tractor, ground wheels supporting the frame, trailing plowing units having at their front ends vertically fixed transverse horizontal pivotal connections with the frame, vertically adjustable ground wheels normally carrying the units respectively in fixed relation to the ground, tension members independent of each other connected respectively to the plowing units and the wheels to lift the units by pressing down on the wheels, and power transmitting elements operable by the draft frame ground wheels and connected directly to the frame to be movable only in fixed predetermined relation thereto and to each other, the said elements being connected independently of each other to the said tension members respectively and serving at will to actuate them beginning with the one for the foremost unit automatically in succession at uniform intervals of time, thereby causing the plowing units beginning with the foremost to be lifted on their ground wheels in succession at uniform intervals definitely related to the speed of travel.

15. The combination of a draft frame detachably and flexibly connectible with a tractor, trailing plowing units having at their front ends vertically fixed transverse horizontal pivotal connections with the frame, vertically adjustable ground wheels normally carrying the units respectively in fixed relation to the ground, a power mechanism having all of its parts operable only in fixed predetermined relation to the frame, and mutually independent uniformly speeded power transmitting trains acting in uniform succession and connecting the power mechanism with the several adjustable ground wheels respectively to move them successively with respect to their units, thereby successively lifting the said units upon their ground wheels.

16. The combination of a draft frame detachably and flexibly connectible with a tractor, ground wheels upon which the frame is entirely supported, trailing plowing units having at their front ends vertically fixed transverse horizontal pivotal connections with the frame, vertically adjustable ground wheels normally carrying the units respectively in fixed relation to the ground, and mutually independent uniformly speeded power transmitting trains connecting the draft frame ground wheels with the several adjustable ground wheels respectively to move them with respect to their units, the initial power receiving elements of the said trains being fixedly connected with each other and serving when actuated to start the transmission of power through the several trains successively at uniform intervals of time, whereby the said units are successively lifted upon their ground wheels at intervals definitely related to the speed of travel.

17. The combination of a draft frame detachably connectible to a tractor, ground wheels upon which the frame is entirely supported, trailing plowing units having at their front ends vertically fixed transverse horizontal pivotal connections with the frame, adjustable ground wheels normally carrying the units respectively in fixed relation to the ground, the said units being definitely limited as to downward movement with respect to the corresponding wheels but being at all times free for upward movement when power is applied, and mutually independent uniformly speeded power transmitting trains acting in uniform succession and connecting the draft frame ground wheels with the several adjustable ground wheels respectively to move them successively with respect to their units, thereby successively lifting the said units upon their ground wheels at uniform intervals definitely related to the speed of travel.

18. The combination of a draft frame detachably and flexibly connectible with a tractor, ground wheels upon which the frame is entirely supported, trailing plowing units having at their front ends vertically fixed transverse horizontal pivotal connections with the frame, vertically adjustable ground wheels normally carrying the units respectively in fixed relation to the ground, and mutually independent uniformly speeded power transmitting trains connecting the draft frame ground wheels with the several adjustable ground wheels respectively to move them with respect to their units, the said trains first acting successively to lift the units, beginning with the foremost, upon their ground wheels in uniform succession and then acting successively to release the units, beginning with the foremost, to permit them to drop in uniform succession.

19. The combination of a draft frame detachably and flexibly connectible to a tractor, ground wheels supporting the frame, trailing plowing units having at their front ends vertically fixed transverse horizontal pivotal connections with the frame, vertically adjustable ground wheels normally carrying the units respectively in fixed relation to the ground, power transmitting elements, operable by the draft frame ground wheels and connected directly to the frame to be movable only in fixed predetermined relation thereto and to each other, independent tension members connecting the said power transmitting elements independently of each other with the plowing units and the wheels respectively to lift the units by pressing down on the wheels, the said transmitting elements serving at will to actuate the tension members beginning with the one for the foremost unit, automatically in succession at uniform intervals of time definitely related to the speed of travel thereby causing the plowing units beginning with the foremost, to be lifted on their ground wheels in succession at uniform intervals and the said transmitting elements subsequently serving at will to release the tension members, beginning with the foremost, automatically in succession at uniform intervals definitely related to the speed of travel of time, thereby permitting the plowing units, beginning with the foremost, to drop in succession at uniform intervals.

20. The combination of a draft frame detachably and flexibly connectible with a tractor, trailing plowing units having at their front ends vertically fixed transverse horizontal pivotal connections with the frame, vertically adjustable ground wheels normally carrying the units respectively in fixed relation to the ground, a power mechanism having all of its parts operable only in fixed predetermined relation to the frame, and mutually independent uniformly speeded power transmitting trains connecting the power mechanism with the several adjustable ground wheels respectively and acting in uniform succession first to move them successively downward with respect to their units and then to release them to permit them to move successively upward with respect to their units, thereby successively lifting the said units upon their ground wheels and then successively lowering them.

21. The combination of a draft frame detachably and flexibly connectible with a tractor, trailing plowing units having at their front ends vertically fixed transverse horizontal pivotal connections with the frame, vertically adjustable ground wheels normally carrying the units respectively in fixed relation to the ground, a power mechanism having all of its parts operable only in fixed predetermined relation to the frame, tension members independent of each other connected respectively to the plowing units of the wheels to lift the units by pressing down on the wheels, and power transmitting elements operable by the said power mechanism and connected directly to the frame to be movable only in fixed predetermined relation thereto, the said elements being connected independently of each other to the said tension members respectively and serving at will to actuate them beginning with the one for the foremost unit automatically in succession at uniform intervals of time, thereby causing the plowing units beginning with the foremost to be lifted on their ground wheels in succession at uniform intervals.

22. The combination of a draft frame detachably connectible to a tractor, ground wheels upon which the frame is entirely supported, trailing plowing units having at their front ends vertically fixed transverse horizontal pivotal connections with the frame, adjustable ground wheels normally carrying the units respectively in fixed relation to the ground, the said units being definitely limited as to downward movement with respect to the corresponding wheels but being at all times free for upward movement when power is applied, a power mechanism having all of its parts operable only in fixed predetermined relation to the frame, and mutually independent uniformly speeded power transmitting trains acting in uniform succession and connecting the said power mechanism with the several adjustable ground wheels respectively to move them successively with respect to their units, thereby successively lifting the said units upon their ground wheels at uniform intervals.

23. The combination of a draft frame detachably and flexibly connectible with a tractor, trailing plowing units having at their front ends vertically fixed transverse horizontal pivotal connections with the frame, vertically adjustable ground wheels normally carrying the units respectively in fixed relation to the ground, a power mechanism having all of its parts operable only in fixed predetermined relation to the frame, levers pivoted to the respective units and connected to the ground wheels thereof, forward extending links connected respectively with the levers, and mutually independent uniformly speeded power transmitting devices on the draft frame acting in uniform succession and connecting the power mechanism with the front ends of the several links to move them successively, thereby successively moving the levers and ground wheels and lifting the said units upon their ground wheels.

24. The combination of a draft frame detachably and flexibly connectible with a tractor, ground wheels upon which the frame is entirely supported, trailing plowing units having at their front ends vertically fixed transverse horizontal pivotal connections with the frame, vertically adjustable ground wheels normally carrying the units respectively in fixed relation to the ground, and mutually independent uniformly speeded ground wheel actuated power transmitting trains connected with the several adjustable ground wheels respectively and acting in uniform succession to move the latter with respect to their units, thereby successively lifting the said units at uniform intervals definitely related to the speed of travel.

25. The combination of a draft frame detachably and flexibly connectible with a tractor, ground wheels upon which the frame is entirely supported, trailing plowing units having at their front ends vertically fixed transverse horizontal pivotal connections with the frame, vertically adjustable ground wheels normally carrying the units respectively in fixed relation to the ground, and mutually independent uniformly speeded ground wheel actuated power transmitting trains connected with the several adjustable ground wheels respectively and acting to move the wheels downward with respect to their units in uniform succession and subsequently to release them to permit them to move upward with respect to their units in uniform succession, thereby successively lifting and subsequently lowering the said units at uniform intervals definitely related to the speed of travel.

26. The combination of a draft frame detachably and flexibly connectible with a tractor, ground wheels upon which the frame is entirely supported, trailing plowing units having at their front ends vertically fixed transverse horizontal pivotal connections with the frame, vertically adjustable ground wheels normally carrying the units respectively in fixed relation to the ground, a manually engageable clutch having its driving element connected with the draft frame ground wheels, and mutually independent uniformly speeded power transmitting trains connecting the driven element of the said clutch with the several adjustable ground wheels respectively and acting in uniform succession to move the latter with respect to their units, thereby successively lifting the said units at uniform intervals definitely to the speed of travel.

27. The combination of a draft frame detachably and flexibly connectible with a tractor, ground wheels upon which the frame is entirely supported, trailing plowing units having at their front ends vertically fixed transverse horizontal pivotal connections with the frame, vertically adjustable ground wheels normally carrying the units respectively in fixed relation to the ground, a manually engageable clutch having its driving element connected with the draft frame ground wheels, mutually independent uniformly speeded power transmitting trains connecting the driven element of the said clutch with the several adjustable ground wheels respectively and acting in uniform succession to move the latter with respect to their units, thereby successively lifting the said units at uniform intervals definitely to the speed of travel, and means for automatically disengaging the clutch after the lifting of all of the units.

28. The combination of a draft frame detachably and flexibly connectible with a tractor, ground wheels upon which the frame is entirely supported, trailing plowing units having at their front ends vertically fixed transverse horizontal pivotal connections with the frame, vertically adjustable ground wheels normally carrying the units respectively in fixed relation to the ground, a manually engageable clutch having its driving element connected with the draft frame ground wheels, power transmitters independent of each other and connected respectively to the said wheels and plowing units to lift the units by pressing down on the wheels, means on the frame connected with the driven element of the clutch and comprising a plurality of rotatable angularly spaced eccentric arms, devices connected with the said power transmitters and engaging respectively with the said eccentric arms, whereby when the arms are turned the transmitters are actuated in succession at uniform intervals of time and at uniform speeds to cause the plowing units to be lifted successively at uniform intervals and at uniform speeds and whereby at the end of a part of a revolution the transmitters are locked by the arms against retrograde movement thereby holding the units in lifted positions, and means for automatically disengaging the clutch at the end of the said part of a revolution.

29. The combination of a draft frame detachably and flexibly connectible with a tractor, a diagonal series of trailing plowing units having at their front ends vertically fixed transverse horizontal pivotal connections with the frame, vertically adjustable ground wheels normally carrying the units respectively in fixed relation to the ground, a power mechanism having all of its parts operable only in fixed predetermined relation to the frame, power transmitting devices connected with the several adjustable ground wheels respectively to move them downward with respect to their units, and means actuated by the said power mechanism for actuating the said devices successively beginning with the one for the foremost unit to lift the units successively and for releasing the said devices successively beginning with the one for the foremost unit to drop the units successively.

30. The combination of a draft frame detachably and flexibly connectible with a tractor, ground wheels upon which the frame is entirely supported, a diagonal series of trailing plowing units having at their front ends vertically fixed transverse horizontal pivotal connections with the frame, vertically adjustable ground wheels normally carrying the units respectively in fixed relation to the ground, power transmitting devices connected with the several adjustable ground wheels respectively to move them with respect to their units, and means actuated by the draft frame ground wheels for actuating the said devices successively beginning with the one for the foremost unit to lift the units successively and for releasing the said devices successively beginning with the one for the foremost unit to drop the units successively.

In testimony whereof I affix my signature, in presence of two witnesses.

JOHN B. BARTHOLOMEW.

Witnesses:
A. L. GREGORY,
J. M. CALDWELL.